United States Patent
Benjamin et al.

(10) Patent No.: US 12,293,136 B2
(45) Date of Patent: May 6, 2025

(54) COMPUTER-IMPLEMENTED TECHNIQUES FOR CREATING LAYOUTS FOR PHYSICAL SPACES

(71) Applicant: AUTODESK, INC., San Francisco, CA (US)

(72) Inventors: David Benjamin, Brooklyn, NY (US); Rui Wang, New York, NY (US); Dale Zhao, New York, NY (US)

(73) Assignee: AUTODESK, INC., San Francisco, CA (US)

( * ) Notice: Subject to any disclaimer, the term of this patent is extended or adjusted under 35 U.S.C. 154(b) by 760 days.

(21) Appl. No.: 17/099,552

(22) Filed: Nov. 16, 2020

(65) Prior Publication Data
US 2021/0150092 A1    May 20, 2021

Related U.S. Application Data

(60) Provisional application No. 62/937,188, filed on Nov. 18, 2019.

(51) Int. Cl.
*G06F 30/13*    (2020.01)
*G06F 111/04*    (2020.01)

(52) U.S. Cl.
CPC .......... *G06F 30/13* (2020.01); *G06F 2111/04* (2020.01)

(58) Field of Classification Search
CPC .. G06F 30/00; G06F 2111/20; G06F 2111/16; G06F 30/13; G06F 2111/04
USPC .......................................................... 703/1
See application file for complete search history.

(56) References Cited

U.S. PATENT DOCUMENTS

| | | | |
|---|---|---|---|
| 2018/0137213 A1 | 5/2018 | Benjamin et al. | |
| 2018/0253511 A1* | 9/2018 | Benjamin | G06F 30/13 |
| 2019/0026401 A1 | 1/2019 | Benjamin et al. | |
| 2020/0134243 A1* | 4/2020 | Vardi | G06F 30/13 |

FOREIGN PATENT DOCUMENTS

WO    2018/165654 A1    9/2018

OTHER PUBLICATIONS

Georgiadis, Michael C. et al., "A General Mathematical Programming Approach for Process Plant Layout", Jan. 5, 1999, Eslevier Science Ltd. (Year: 1999).*

(Continued)

*Primary Examiner* — Cedric Johnson
(74) *Attorney, Agent, or Firm* — Artegis Law Group, LLP

(57) ABSTRACT

One or more embodiments disclose techniques for generating a layout for a physical space or a building. The techniques include generating a layout based on a floorplan of a physical space, generating a plurality of spatial unit grids corresponding to a plurality of spatial units to be placed in the physical space, identifying a placement for a first spatial unit grid in the plurality of spatial unit grids within the layout by matching a corner cell in the first spatial unit grid with a given available cell in the layout, generating a score associated with the placement for the first spatial unit grid based on one or more placement parameters that define placement constraints for a first spatial unit included in the plurality of spatial units and corresponding to the first spatial unit grid, and placing the first spatial unit grid in the layout based on the score.

20 Claims, 5 Drawing Sheets

(56) References Cited

OTHER PUBLICATIONS

Nimtawat, Anan et al., "Automated Layout Design of Beam-Slab Floors Using a Genetic Algorithm", 2009, Computers and Structures 87, Elsevier Ltd. (Year: 2009).*

Nimtawat, Anan et al., "Automated Layout Design of Beam-Slab Floors Using a Genetic Algorithm", Jun. 11, 2009, Computers and Structures 87, Elsevier Ltd. (Year: 2009).*

International Search Report for application No. PCT/US2020/060863 dated Mar. 15, 2021.

Charman, Philippe, "A constraint-based approach for the generation of floor plans", Tools With Artificial Intelligence, XP010100863, DOI: 10.1109/TAI.1994.346443, Nov. 6, 1994, pp. 555-561.

* cited by examiner

Layout 330

|   | 0 | 1 | 2 | 3 | 4 | 5 | 6 | 7 | 8 |
|---|---|---|---|---|---|---|---|---|---|
| 5 | v | v | v | v | v | v | v |   |   |
| 4 |   |   | v | v | v | v | U1 |   |   |
| 3 |   |   |   |   |   |   | U1 | U1 | U1 |
| 2 |   |   |   |   |   |   | U1 | U1 | U1 |
| 1 |   |   |   |   |   |   | U1 | U1 | U1 |
| 0 |   | v | v | v | v | v | v |   |   |

Transformed Spatial Unit 350

|   | 0 | 1 | 2 | 3 |
|---|---|---|---|---|
| 2 |   | U2 | U2 | U2 |
| 1 | U2 | U2 | U2 | U2 |
| 0 | U2 | U2 |   |   |

FIG. 3A

Layout 330

|   | 0 | 1 | 2 | 3 | 4 | 5 | 6 | 7 | 8 |
|---|---|---|---|---|---|---|---|---|---|
| 5 | v | v | v | v | v | v | v |   |   |
| 4 |   |   | v | v | v | v | U1 |   |   |
| 3 |   |   |   | U2 | U2 | U2 | U1 | U1 | U1 |
| 2 |   |   | U2 | U2 | U2 | U2 | U1 | U1 | U1 |
| 1 |   |   | U2 | U2 |   |   | U1 | U1 | U1 |
| 0 |   | v | v | v | v | v | v |   |   |

Transformed Spatial Unit 350

FIG. 3B

Layout 330

|   | 0 | 1 | 2 | 3 | 4 | 5 | 6 | 7 | 8 |
|---|---|---|---|---|---|---|---|---|---|
| 5 | v | v | v | v | v | v | v |   |   |
| 4 | U2 | U2 | v | v | v | v | U1 |   |   |
| 3 | U2 | U2 | U2 |   |   |   | U1 | U1 | U1 |
| 2 |   | U2 | U2 |   |   |   | U1 | U1 | U1 |
| 1 |   | U2 | U2 |   |   |   | U1 | U1 | U1 |
| 0 |   | v | v | v | v | v | v |   |   |

FIG. 3C

COMPUTER-IMPLEMENTED TECHNIQUES FOR CREATING LAYOUTS FOR PHYSICAL SPACES

CROSS-REFERENCE TO RELATED APPLICATIONS

This application claims the priority benefit of the U.S. Provisional Patent Application having Ser. No. 62/937,188 and filed on Nov. 18, 2019. The subject matter of this related application is hereby incorporated herein by reference.

BACKGROUND

Field of the Various Embodiments

Embodiments of the present invention relate generally to computer-aided design software and, more specifically, to computer-aided techniques for creating layouts for architecture and physical spaces.

Description of the Related Art

Computer-aided design (CAD) tools are used to facilitate the design of building and office layouts for a wide variety of purposes. For instance, some CAD applications facilitate the design of the architecture for building structures. Other CAD applications facilitate the design of electrical, plumbing, ventilation, and other structural features of enclosed building spaces. Yet other CAD applications facilitate the design of the office space layout for a particular floorplan or set of floorplans. Oftentimes, these types of CAD applications enable a user to generate a digital model of the layout by receiving parameters from the user and generating layouts that satisfy the parameters.

In conventional approaches for generating layout designs, a CAD application receives information regarding the desired layout and divides the floorplan based on the desired layout. Once the CAD application generates the layout designs, the user and/or the CAD application must verify whether the resulting rooms satisfy the options, purposes, and parameters that the user requires. For example, the CAD application may generate layout designs that have too many or not enough rooms, do not conform to room placing requirements, and/or do not satisfy room purposes, design preferences, or layout requirements. Thus, the CAD application iterates through the generation of multiple layout designs until a satisfactory design is found. Each such iteration is computationally intensive and time-consuming and, oftentimes, repeatedly yields layouts that do not conform to the requirements. As a result, the process of generating layout designs is inefficient and computationally wasteful.

As the foregoing illustrates, what is needed in the art are more effective techniques for generating layout designs for physical spaces.

SUMMARY

One embodiment of the present application sets forth a computer-implemented method for generating a layout for a physical space. The method includes generating a layout based on a floorplan of a physical space, generating a plurality of spatial unit grids corresponding to a plurality of spatial units to be placed in the physical space, identifying a placement for a first spatial unit grid in the plurality of spatial unit grids within the layout by matching a corner cell in the first spatial unit grid with a given available cell in the layout, generating a score associated with the placement for the first spatial unit grid based on one or more placement parameters that define placement constraints for a first spatial unit included in the plurality of spatial units and corresponding to the first spatial unit grid, and placing the first spatial unit grid in the layout based on the score.

At least one advantage and technological improvement of the disclosed techniques is that the layout generation module generates layouts in a manner that satisfies the design parameters at every sequence step of layout generation. Consequently, the layout generation module does not spend time, energy, and resources generating layouts that do not meet parametric requirements. Another advantage and technological improvement is the generation of layouts with increased space utility, reduced space fragments that are too small for use, and longer circulation paths formed by unit boundaries. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3A illustrates a layout and a transformed spatial unit, according to one or more aspects of the various embodiments;

FIG. 3B illustrates an embodiment of the transformed spatial unit of FIG. 3A transformed into the layout of FIG. 3A, according to one or more aspects of the various embodiments;

FIG. 3C illustrates an embodiment of the transformed spatial unit of FIG. 3A placed within the layout of FIG. 3A, according to one or more aspects of the various embodiments;

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
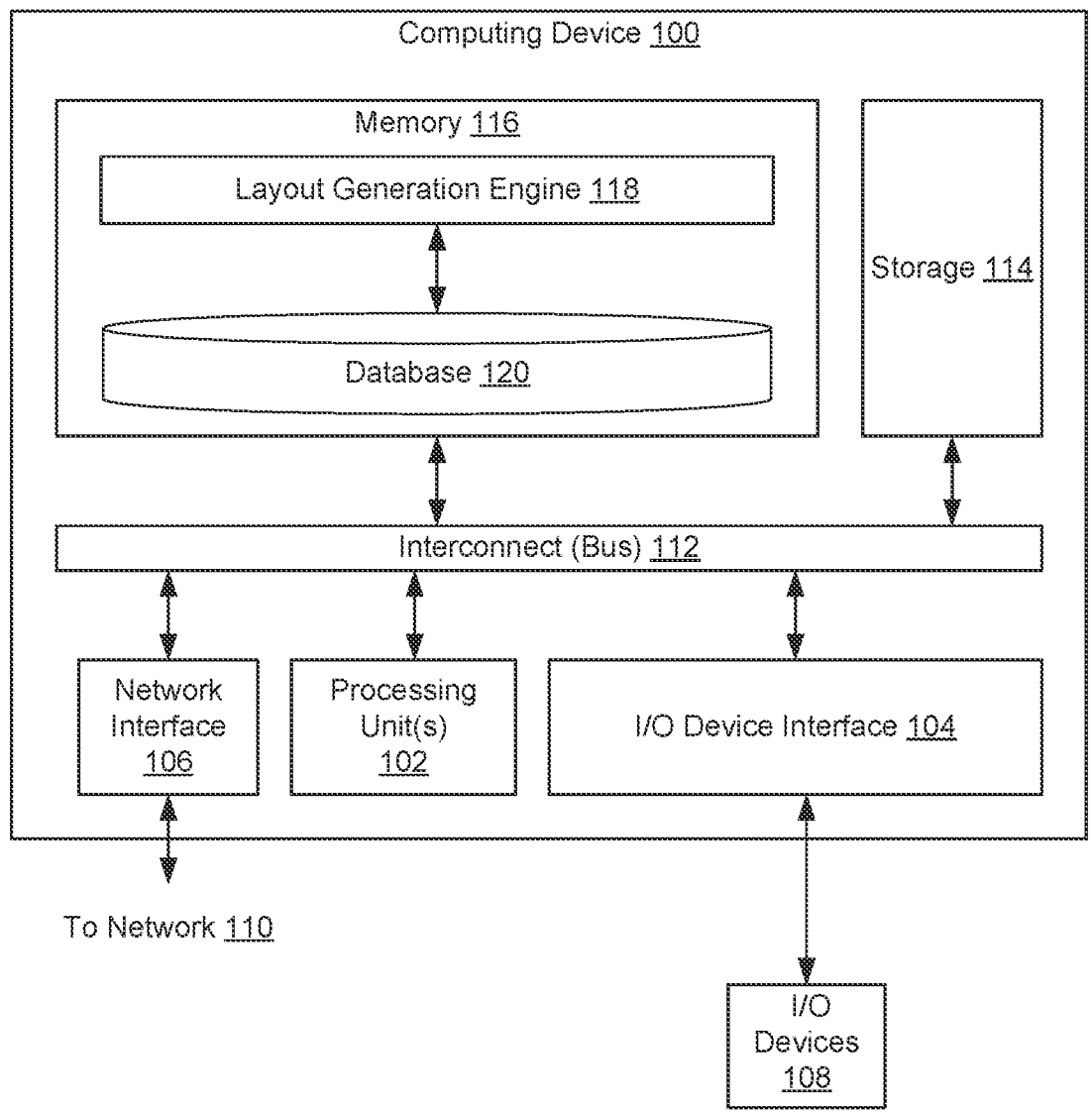
FIG. 1 illustrates a block diagram of a computing device configured to implement one or more aspects of the various embodiments.

FIG. 1 illustrates a computing device 100 configured to implement one or more aspects of the various embodiments. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Layout generation engine 118 may be stored in storage 114 and may be completely or partially loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processing unit(s) 102 and application data associated with said software programs, including layout generation engine 118 and database 120.

While not shown in FIG. 1, it will be apparent to one of skilled in the art that database 120 and/or storage 114 may exist or be implemented in cloud systems or computing devices other than computing device 100. Computing device 100 may access these cloud systems and/or other computing devices and their databases 120 or storages 114 in network 110 via network interface 106 or through USB or other types of connections via I/O device interface 104.

Layout generation engine 118 receives inputs, including inputs from database 120, I/O devices 108, network 110, and/or the like. Layout generation engine 118 processes the inputs to generate layouts for physical spaces. In operation, layout generation engine 118 receives inputs specifying multiple spatial units to be placed in a physical space. Layout generation engine 118 generates a layout associated with the physical space and packs the spatial units specified in the input into the layout in a manner that is space efficient and also satisfies design and workflow requirements. Layout generation engine 118 and database 120 are described in further detail below with respect to FIG. 2.

Figure 2:
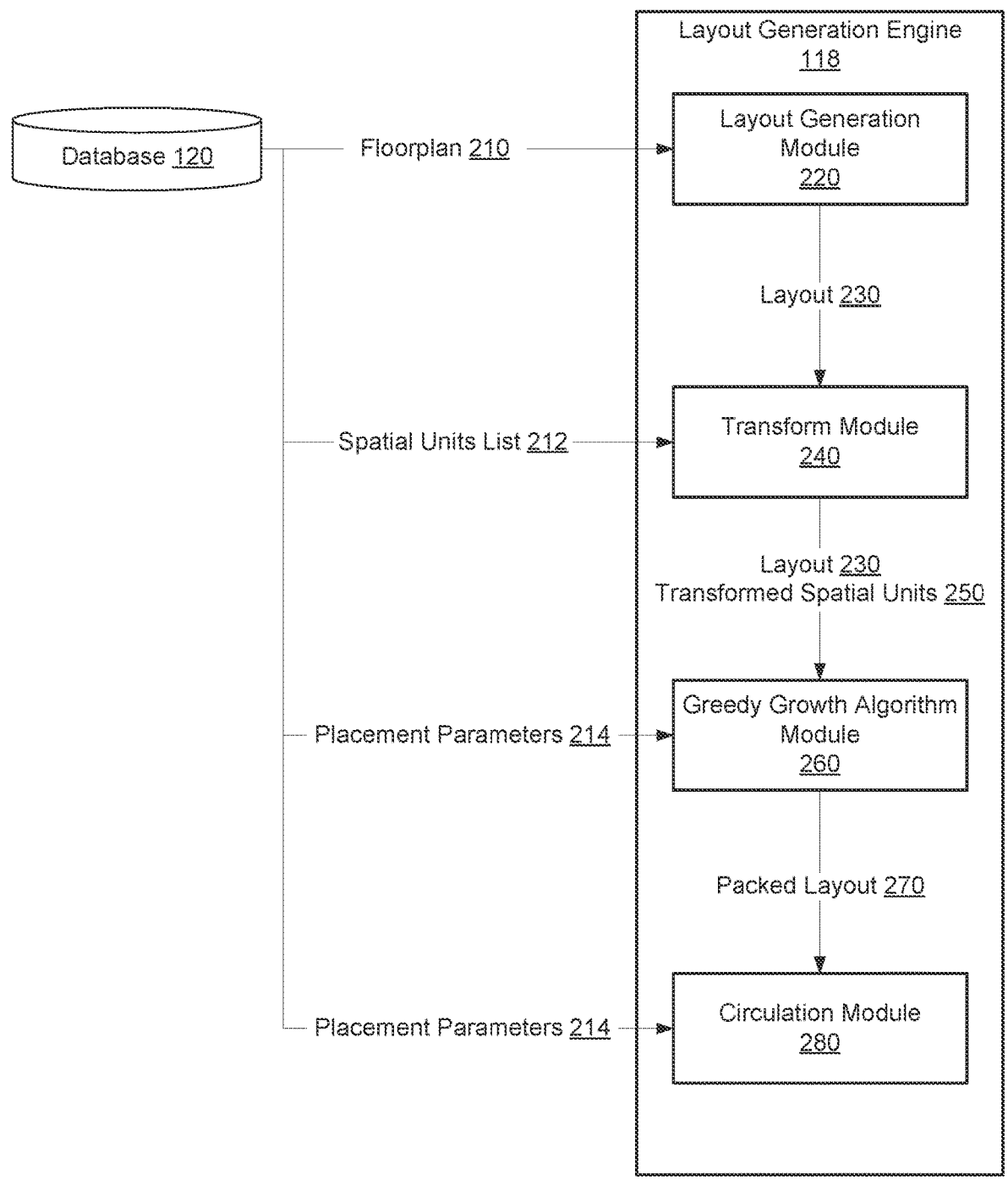
FIG. 2 is a more detailed illustration of layout generation engine and database of FIG. 1, according to one or more aspects of the various embodiments.

FIG. 2 is a more detailed illustration of layout generation engine 118 and database 120 of FIG. 1, according to various embodiments of the present disclosure. As shown, layout generation engine 118 includes a layout generation module 220, a transform module 240, a greedy growth algorithm module 260, and a circulation module 280. Database 120 includes a floorplan 210, a spatial units list 212, and/or placement parameters 214 that are provided to one or more of the various modules of layout generation engine 118.

Database 120 provides floorplan 210 to layout generation module 220. Floorplan 210 specifies characteristics associated with a given physical space for which layouts are to be generated. The characteristics associated with the physical space include, without limitation, one or more lengths associated with floorplan 210, one or more widths associated with floorplan 210, length of the boundaries of floorplan 210, angles between the boundaries, angle apertures, angle locations, shape of the boundaries, available area in a physical space, shape of area, area size, shape of physical space, physical space size, spatial distances and relationships between discontinuous boundaries, areas and physical spaces, and/or the like. In various embodiments, when a physical space represents a given building, floorplan 210 may include characteristics of one or more floors or flights of the building, separate disconnected spaces, irregularly shaped spaces, and/or one or more areas that are not available to be occupied or used for layout generation. For example, the building may be cylindrical and hollow with stairs at the north end. In this example, floorplan 210 would specify an outer boundary with a circular shape. Because the building is hollow, floorplan 210 would specify an internal boundary that forms an area smaller than the area of the circle formed by the outer boundary. One or more layouts can be generated for the physical space between the internal boundary and the outer boundary. When a building includes multiple floors and/or one or more areas that are discontinuous from any other physical space or area, the floorplan 210 may include information regarding the relationships between the different floors and areas, such as floor number, distance between floors and/or areas, and/or the like.

Layout generation module 220 receives floorplan 210 and generates a layout 230 based on the characteristics associated with the physical space specified by floorplan 210. Layout generation module 220 analyzes the characteristics associated with the physical space specified by floorplan 210. In operation, layout generation module 220 generates layout 230 based on the characteristics associated with the physical space specified by floorplan 210. Layout 230 is a digital representation of the physical space that corresponds to a floorplan, such as floorplan 210. Layout 230 is represented as a two-dimensional grid of cells, where each cell represents a given amount of two-dimensional physical space. The more cells for a given amount of real physical space, the more granular the approximation by the grid of cells of the real physical space. In various embodiments, the number of cells in the grid generated for layout 230 is determined based on a minimum level of granularity needed to accurately represent the physical space. The level of granularity corresponds to the number of cells a layout such as layout 230 has for a given area in real physical space. The level of granularity may be based on the current floorplan and may additionally account for possible future expansions/modifications to the floorplan. The level of granularity of layout 230 may be modified by any module of layout generation engine 118. When modifying the level of granularity of layout 230, the original characteristics are separately maintained in order to enhance layout 230 at the new level of granularity or subsequently revert to a version of layout 230 reflective of the original characteristics.

In one embodiment, layout 230 has at least three types of cells in the grid: empty cells, occupied cells, and void cells. Empty cells represent available physical space. Occupied cells represent occupied or obstructed physical space that is unavailable for placing any spatial units, as described below. Void cells represent an area that cannot be occupied. Following the example above of the cylindrical and hollow building, layout 230 would have the physical available space represented in the grid with empty cells and the space for the internal area and the area outside the cylinder represented in the grid with void cells. The internal and external boundaries are approximated by the boundaries of the void cells.

In one embodiment, layout 230 has concave corners, convex corners, and/or flat corners formed by the boundaries of layout 230, void cells, and/or the edges resulting from occupied cells. A concave corner faces inward towards the boundary. A convex corner faces outward from the boundary. A flat corner does not have any cells between two boundaries (e.g. walls) that face each other and that make a straight boundary at an end of the two facing boundaries. A straight boundary of a flat corner is at least one cell away from the two facing boundaries in both directions (therefore, the straight boundary is at least the length of two cells). Thus, a flat corner is located at a meeting point of an end of two facing boundaries when there are no cells between the two facing boundaries. Another way to describe a flat corner is when two concave corner meet, tip to tip, with a boundary of the one of the concave corners parallel to a boundary of the other concave corner and no cells between the boundaries.

The grid of cells of layout 230 has a corresponding coordinate system. The cells of layout 230 are arranged with respect to the coordinate system of the grid of cells of layout 230. For example, for square-shaped cells with four vertices, the square-shaped cells may be arranged so that the bottom left vertex of each square-shaped cell corresponds to a coordinate. In the example, the cell at the origin is the cell with bottom left vertex at coordinate (0, 0) of the grid of cells. Cells, cells vertices, and/or corners of layout 230 are identified and/or located by the corresponding coordinates. Coordinates for layouts are further explained in the discussion of FIG. 3A, below.

Database 120 provides spatial units list 212 to transform module 240. Spatial units list 212 specifies characteristics of physical spaces (referred to herein as "spatial units") that are to be placed within layout 230. A spatial unit may be a room, office, kitchen, open space, outside area, or the like. Spatial units list 212 includes a catalog of one or more spatial units. Each spatial unit is associated with one or more characteristics included in spatial units list 212. The spatial unit characteristics associated with a given spatial unit include, without limitation, one or more lengths associated with a spatial unit, one or more widths associated with a spatial unit, length of the boundaries of a spatial unit, angles between the boundaries, angle apertures, angle locations, shape of the boundaries, available area in a physical space, shape of area, area size, shape of physical space, physical space size, spatial distances and relationships between discontinuous boundaries, areas and physical spaces, and/or the like. Spatial units list 212 can include an order of placement according to an order in which spatial units are to be placed in layout 230. The order of placement of spatial units may be conditional, unconditional, mandatory, preferential, and/or the like. Further, the order of placement may apply to all or a subset of the spatial units.

Transform module 240 receives layout 230 and spatial units list 212. In operation, transform module 240 generates one or more transformed spatial units 250 based on layout 230 and spatial units list 212. Transform module 240 analyzes the spatial unit characteristics in spatial units list 212 that correspond to each of the one or more spatial units and transforms one or more of the spatial units into one or more transformed spatial units 250.

Transform module 240 generates one or more transformed spatial units 250 based on the analysis of characteristics associated with spatial units in spatial units list 212. Each transformed spatial unit 250 is a digital representation of a corresponding spatial unit and is represented as a two-dimensional grid of cells, where each cell represents a given amount of two-dimensional physical space. In various embodiments, the number of cells in the grid generated for each transformed spatial unit 250 is determined depending on a minimum level of granularity needed to accurately represent the characteristics and/or physical space. The level of granularity is the amount of cells that a transformed spatial unit occupies for a given area in real physical space. The level of granularity may be based on the spatial unit characteristics. The level of granularity of transformed spatial units 250 may be modified by any module of layout generation engine 118.

Each transformed spatial unit 250 may have at least two types of cells in the grid: empty cells and occupied cells. Occupied cells represent the physical space that transformed spatial units 250 occupy when placed on a layout such as layout 230, as described below. Empty cells represent available physical space. The internal and external boundaries are approximated by the boundaries of the empty cells. In one embodiment, the grid of cells for each transformed spatial unit 250 has a corresponding coordinate system. The transformed spatial units 250 may share the same coordinate system. In operation, transform module 240 translates transformed spatial units 250 from any coordinate system into the coordinate system of layout 230. The cells of each transformed spatial unit 250 are arranged with respect to the coordinate system of the grid of cells of each transformed spatial unit 250.

Layout generation engine 118 determines the level of granularity based on floorplan 210, spatial units lists 212, and placement parameters 214. For example, a particular parameter of floorplan 210 or spatial units list 212 may require higher granularity than any other parameter in floorplan 210 or spatial units lists 212. While not shown in FIG.

2, layout generation engine 118 may receive user input setting, raising, or modifying the level of granularity. During execution, layout generation engine 118 may alter the level of granularity for layout 230 to match the level of granularity of transformed spatial units 250. In addition or alternatively, transform module 240 may alter the level of granularity for transformed spatial units 250 to match the level of granularity of layout 230.

Database 120 delivers placement parameters 214 to greedy growth algorithm module 260. Placement parameters, such as placement parameters 214, are parameters that control how one or more transformed spatial units 250 are placed within a given layout, such as layout 230. Placement parameters 214 include one or more parameters, constraints, factors, requirements, options, settings, initial values, boundary conditions, data, and/or the like, that may affect the operation, execution, and/or functionality of layout generation engine 118 and/or one or more modules of layout generation engine 118. Placement parameters 214 can be independent of or be partially or completely included in floorplan 210 and/or spatial units list 212. Placement parameters 214 may be mandatory or preferential. Mandatory parameters must be implemented in operation unless explicit exceptions apply (e.g., a bypass parameter allows for non-application of the mandatory parameter). Preferential parameters do not require mandatory implementation. Placement parameters 214 can be based on real physical spaces, approximations of real physical spaces, floorplan 210, spatial units list 212, layout 230, transformed spatial units 250, packed layout 270, layout generation engine 118, and/or one or more modules of layout generation engine 118. Placement parameters 214 may be based on individuals and/or groups and/or all team members that will use the physical space of layout 230. Placement parameters 214 can applied to approximations of real physical spaces, floorplan 210, spatial units list 212, layout 230, transformed spatial units 250, packed layout 270, layout generation engine 118, and/or one or more modules of layout generation engine 118. Placement parameters 214 may be manually commanded or modified by the user at or prior to execution of layout generation engine 118, and/or one or more modules of layout generation engine 118. Placement parameters 214 may include the following exemplary parameters:

a. Physical space purpose parameter: a physical space purpose parameter describes one or more purposes, intended uses, functions, designations, and/or objectives for a physical space b. Spatial unit purpose parameter: a spatial unit purpose parameter describes one or more purposes, intended uses, functions, designations, and/or objectives for one or more spatial units of spatial units list 212 and/or one or more transformed spatial units 250 c. Orientation parameter: an orientation parameter describes a one or more orientations, and/or prohibited orientations, for one or more transformed spatial units 250.

d. Specific placement parameter: a specific placement parameter describes one or more particular places, areas, orientations, sections of the grid, sets of cells, and/or the like, for placement of one or more transformed spatial units 250 e. Placement order parameter: a placement order parameter describes, or provides the criteria for determining, the arranging for placement of spatial units of spatial units list 212 and/or transformed spatial units 250 f. Adjacency parameter: an adjacency parameter describes criteria and/or requirements for determining placement of one or more spatial units of spatial units list 212 and/or transformed spatial units 250 adjacent to each other or not adjacent to each other g. Proximity parameter: a proximity parameter describes criteria and/or requirements for determining placement of one or more spatial units of spatial units list 212 and/or transformed spatial units 250 within a proximity range of each other h. Distance parameter: a distance parameter describes criteria and/or requirements for determining placement of one or more spatial units of spatial units list 212 and/or transformed spatial units 250 at a distance of each other in terms of spatial units, transformed spatial units 250, cells, physical length, and/or the like.

i. Separation parameter: a separation parameter describes criteria and/or requirements for determining placement of one or more spatial units of spatial units list 212 and/or transformed spatial units 250 not within a range of each other j. Corner preference parameter: a corner preference parameter modifies placement scoring based on the type of corner that is tested for placement k. Circulation parameter: a circulation parameter describes criteria and/or requirements for determining a circulation providing appropriate access to each of transformed spatial units 250 in packed layout 270

Greedy growth algorithm module 260 receives placement parameters 214 from database 120 and receives layout 230 and transformed spatial units 250 from transform module 240. In operation, greedy growth algorithm module 260 generates one or more packed layouts 270 based on placement parameters 214, layout 230, and/or transformed spatial units 250. A packed layout 270 includes transformed spatial units 250 placed within layout 230 according to one or more placement parameters 214. When generating a packed layout 270, greedy growth algorithm module 260 iteratively places transformed spatial units 250 in layout 230 until there are no transformed spatial units 250 left to place or there is no arrangement of empty cells that can accept placement of any transformed spatial unit 250 left to place. Greedy growth algorithm module 260 places transformed spatial units 250 within layout 230 according to the placement order parameter. If a placement order parameter has not been specified, then greedy growth algorithm module 260 uses a default order, the actual order of transformed spatial units 250 as cataloged in spatial units list 212 or as provided by transform module 240, or prompts the user to provide the placement order or a criteria for placement order.

When placing a selected transformed spatial unit 250 within layout 230, greedy growth algorithm module 260 identifies a best possible placement for the selected transformed spatial unit 250 by comparing the scores of possible placements within layout 230. Greedy growth algorithm module 260 identifies possible placements, if any, for the selected transformed spatial unit 250 by identifying a set of available corners in layout 230 and performing corner matching between the selected transformed spatial unit 250 and one or more corners of the set of available corners of layout 230.

As discussed above, layout 230 includes at least three types of corners: concave corners, convex corners, and flat corners. To perform corner matching, greedy growth algorithm module 260 identifies one or more empty cells of a corner, translates and/or rotates a selected transformed spatial unit 250 to a corner matching location, and tests the location. To identify an empty cell relative to a concave corner, greedy growth algorithm module 260 identifies which empty cell of layout 230 is closest to the concave corner. To identify empty cells relative to a convex corner, greedy growth algorithm module 260 identifies which two empty cells of layout 230 are closest to the convex corner that also touch the boundary of the cell of layout 230 that forms the tip of the convex corner. To identify empty cells relative to a flat corner, greedy growth algorithm module 260 identifies which two empty cells of layout 230 are closest to the meeting boundaries that form the flat corner. In an alternative embodiment, to identify empty cells, greedy growth algorithm module 260 identifies which coordinate corresponds to the one or more empty cells of layout 230 relative to the corresponding type of corner, as discussed above.

Greedy growth algorithm module 260 translates and/or rotates a selected transformed spatial unit 250 in order to position a corner occupied cell of the selected transformed spatial unit 250 at an identified empty cell of layout 230. A corner occupied cell is an occupied cell that forms a convex corner of the selected transformed spatial unit 250. To translate the selected transformed spatial unit 250, greedy growth algorithm module 260 identifies and tracks the position of one or more cells included in the grid of cells of the selected transformed spatial unit 250 while moving the selected transformed spatial unit 250 through layout 230. To rotate the selected transformed spatial unit 250, greedy growth algorithm module 260 shifts the cells of the selected transformed spatial unit 250 so that the orientation of the selected transformed spatial unit 250 with respect to layout 230 changes. In an alternate embodiment, to rotate the selected transformed spatial unit 250, greedy growth algorithm module 260 modifies the orientation of the coordinate system of the grid of cells of the selected transformed spatial unit 250 with respect to layout 230. In yet another alternate embodiment, to rotate the selected transformed spatial unit 250, greedy growth algorithm module 260 shifts the cells of the selected transformed spatial unit 250 with respect to the coordinate system of the selected transformed spatial unit 250. Greedy growth algorithm module 260 may rotate the selected transformed spatial unit 250 in any technically feasible way.

When greedy growth algorithm module 260 translates and/or rotates the selected transformed spatial unit 250 such that a corner occupied cell of the selected transformed spatial unit 250 is at an identified empty cell of the corner, as discussed above, greedy growth algorithm module 260 tests the corner matching location for the selected transformed spatial unit 250 on layout 230. Greedy growth algorithm module 260 tests the corner matching location by determining whether the placement of the selected transformed spatial unit 250 at the corner matching location is valid or invalid. Greedy growth algorithm module 260 determines that a placement at a corner matching location based on a convex corner of layout 230 is invalid when a tip of a corner of the selected transformed spatial unit 250 touches the tip of a convex corner and no boundary of the selected transformed spatial unit 250 touches the immediate boundaries of the convex corner. Greedy growth algorithm module 260 also determines that a placement at a corner matching location is invalid when the cells of the selected transformed spatial unit 250 cover occupied cells or void cells of layout 230. Greedy growth algorithm module 260 also determines that a placement at a corner matching location is invalid when any of the occupied cells of the selected transformed spatial unit 250 fall outside a boundary of layout 230. If placement at the corner matching location is valid, greedy growth algorithm module 260 identifies the corner matching location as a possible placement and determines a score for that possible placement.

In one embodiment, greedy growth algorithm module 260 scores a possible placement based on a Manhattan distance between the origin of the grid of cells of layout 230 and a cell of the selected transformed spatial unit 250 (e.g., the cell at the origin of the grid of cells of the selected transformed spatial unit 250) placed within the possible placement. In another embodiment, greedy growth algorithm module 260 scores a possible placement based on a Manhattan distance between the cell at the center coordinate of layout 230 and a cell of the selected transformed spatial unit 250 placed within the possible placement. Further, greedy growth algorithm module 260 modifies the score for a given possible placement based on placement parameters. Additionally and/or alternatively, greedy growth algorithm module 260 modifies the scores of one or more possible placements based on placement parameters after all possible placements for the selected transformed spatial unit 250 are identified. For example, a proximity parameter might describe a convenience for a first and a second transformed spatial units 250 to be placed close to each other. Thus, if a given possible placement for the first transformed spatial unit 250 has a particular score but that the given possible placement is next to the second transformed spatial unit 250, greedy growth algorithm module 260 applies any scoring modifications and/or instructions based on the proximity parameter.

Once the possible placements of the selected transformed spatial unit 250 are scored, greedy growth algorithm module 260 compares the scores and determines a placement location for the selected transformed spatial unit 250 based on the relative placement scores of the possible placements. In various embodiments, the placement location corresponds to the possible placement with the best score relative to other possible placements.

In one embodiment, greedy growth algorithm module 260 places the selected transformed spatial unit 250 at the determined placement location. To execute placement, greedy growth algorithm module updates from empty to occupied the cells of layout 230 that correspond to occupied cells of the spatial unit of spatial units 250. The cell update of layout 230 keeps track of which updated cells in layout 230 correspond to which transformed spatial units 250. The placement execution and/or the cell update of layout 230 may include updating one or more placement parameters 214, grid of cells of layout 230, and/or one or more cells of the grid of cells of layout 230. The update of layout 230 may keep track of placement parameters 214 as applicable to particular updated cells in layout 230. The update of layout 230 may also keep track of physical space characteristics and/or spatial unit characteristics, and to which cell and/or grid of cells apply any corresponding physical space characteristics and/or spatial unit characteristics.

The placement of a transformed spatial unit 250 changes the available corners in layout 230 by creating one or more new corners and/or removing one or more old corners. The placement of a transformed spatial unit 250 may change availability of exposure to external boundaries and/or internal boundaries of layout 230. The placement of a transformed spatial unit 250 also may change the shape of the boundaries formed by occupied cells in layout 230. In one embodiment, greedy growth algorithm module 260 updates the boundaries and corners of layout 230. Greedy growth algorithm module 260 analyzes the geometric changes formed to clusters of cells of layout 230 and/or analyzes the perimeter of the last placed transformed spatial unit 250 to identify new corners, corners that no longer exist, and/or changes in boundaries, and update layout 230 to account for the identified new corners, corners that no longer exist, and/or changes in boundaries.

In one embodiment, greedy growth algorithm module 260 selects the next transformed spatial unit 250, if any, according to the placement order and continues the iterative placement process discussed above. If there are no transformed spatial units 250 left to place, or if no other transformed spatial unit 250 may be placed, greedy growth algorithm module 260 delivers packed layout 270 to circulation module 280. Packed layout 270 is layout 230 after the placement process is complete for transformed spatial units 250 that may be placed. Note that packed layout 270 is not necessarily fully packed, as there may be empty cells available in layout 230 in an arrangement in which none of the remaining transformed spatial units 250 fit, and there may be empty cells in layout 230 while there are no more transformed spatial units 250 to place.

Circulation module 280 receives packed layout 270 from greedy growth algorithm module 260 and placement parameters 214 from database 120. Packed layout 270 maintains the information from layout 230 about which updated cells in layout 230 correspond to which transformed spatial units 250. Circulation module 280 identifies potential circulation paths between different transformed spatial units 250 and/or between transformed spatial units 250 and boundaries of layout 230. The potential circulation paths describe potential walkways, paths, halls, spaces, and/or the like between two or more spatial units and/or between spatial units and boundaries. Circulation module 280 generates one or more circulations for packed layout 270 based on the identified boundaries, the potential circulation paths, and/or applicable placement parameters 214. Circulation module 280 may update packed layout 270 with an appropriate circulation. Circulation module 280 may update one or more packed layouts 270 with different appropriate circulations. Circulations may be constrained by one or more circulation parameters. For example, circulation module 280 may be configured to determine the longest possible circulation for packed layout 270. The longest possible circulation would separate all placed transformed spatial units 250. A circulation parameter may constrain the longest circulation length by requiring that the circulation may not touch more than one or two edges of the borders of each transformed spatial unit 250 and/or not encircling any transformed spatial units 250 or particular clusters of transformed spatial units 250. As another example, circulation module 280 may be configured to determine the shortest possible circulation for packed layout 270 that touches every transformed spatial unit 250. The shortest possible circulation that touches every transformed spatial unit 250 might cause separate circulation paths that do not find or connect to each other in packed layout 270. A circulation parameter may constrain the shortest circulation length by requiring that connection between separate circulation paths every 10 spatial unit and/or at least 4 path connections as distant from each other as possible.

FIG. 3A shows a layout 330 consistent with layout 230 and with a corresponding coordinate system and grid of cells, according to one or more aspects of the various embodiments. FIG. 3A also shows a transformed spatial unit 350 consistent with transformed spatial unit 250 and with a corresponding coordinate system and grid of cells. The coordinate systems in FIG. 3A provide numerical coordinates for the corresponding grids of cells. The grid of cells of layout 330 includes occupied cells identified as "U1," representative of a spatial unit number one. The grid of cells of layout 330 also includes empty cells which appear blank, and void cells identified as "v." The grid of cells of transformed spatial unit 350 includes occupied cells identified as "U2," representative of a spatial unit number two. In one embodiment, transformed spatial unit 350 is representative of a spatial unit number 2 from a spatial units list such as spatial units list 212, wherein spatial unit number 2 transforms to transformed spatial unit 350. The grid of cells of transformed spatial unit 350 also includes empty cells which appear blank.

A greedy growth algorithm module such as greedy growth algorithm module 260 is not limited by the grid of cells and/or the coordinates for the grid of cells to perform corner matching nor to identify and/or locate cells and coordinates. For the purposes of discussion, coordinates correspond to the lower left corner of each cell. In one embodiment, a greedy growth algorithm module such as greedy growth algorithm module 260 identifies the convex corners of transformed spatial unit 350 at coordinates, in column (x) by row (y) format, as (0, 0), (0, 2), (4, 1), (2, 0), (1, 3), and (4, 3). Note that coordinates (4, 1), (1, 3), and (4, 3) include rows and/or columns that identify corner location by going beyond the coordinates for the given grid of cells. In another embodiment, a greedy growth algorithm module such as greedy growth algorithm module 260 identifies concave corners of layout 330 at coordinates that include rows and/or columns that are beyond the coordinates for the given grid of cells, among others, layout 330 concave corners at coordinates (7, 6) and (9, 6).

FIG. 3B shows layout 330, with transformed spatial unit 350 transformed into the coordinate system of layout 330 and translated into a concave corner of layout 330, according to one or more aspects of the various embodiments. Specifically, FIG. 3B shows corner matching at a concave corner of layout 330.

For purposes of this corner matching discussion, transformed spatial unit 350, when transformed into the coordinate system of layout 330, the bottom left corner cell of transformed spatial unit 350 was at coordinate (0, 0) of layout 330. In performing corner matching, greedy growth algorithm module 260 identifies the corner at layout coordinate (6, 4) as a concave corner. Greedy growth algorithm module 260 identifies empty cell at (5, 3) as the empty cell closest to the concave corner at coordinate (6, 4). As transformed spatial unit 350 was originally at coordinate (0, 0), greedy growth algorithm module 260 identifies a corner occupied cell of transformed spatial unit 350 to be at coordinate (3, 2). To position a corner occupied cell of transformed spatial unit 350 at the identified empty cell at (5, 3). To position the corner occupied cell at coordinate (3, 2) at the cell location of the identified empty cell at (5, 3), greedy growth algorithm module 260 translated transformed spatial unit 350. To be at the current location shown in FIG. 3B, greedy growth algorithm module 260 translated transformed spatial unit 350 one row up and two columns to the right, to coordinate (1, 2). This is a Manhattan distance of 3 (one up plus two to the right). With transformed spatial unit 350 at the corner matching location, as shown in FIG. 3B, greedy growth algorithm module 260 tests the corner matching location by determining whether the placement of transformed spatial unit 350 at the corner matching location is valid or invalid. As the placement of transformed spatial unit 350 at the corner matching location is valid, the placement of transformed spatial unit 350 at the corner matching location is a possible placement. Greedy growth algorithm module 260 scores the possible placement of transformed spatial unit 350 at the corner matching location. Greedy growth algorithm module 260 continues the process of rotating and translating transformed spatial unit 350 to perform corner matching with different corner occupied cells of transformed spatial unit 350.

FIG. 3C shows layout 330, with transformed spatial unit 350 placed on layout 330 with an orientation different than the original orientation, according to one or more aspects of the various embodiments. For purposes of this rotation discussion, the bottom left corner cell of transformed spatial unit 350 was at coordinate (0, 0) of layout 330 prior to rotation, with an orientation as shown in FIG. 3A. Thus, was placed based on corner matching with convex corner of layout 330 at (1, 1), an identified empty cell for that convex corner at (1, 1), and was rotated prior to placement. To rotate transformed spatial unit 350 to the orientation shown in FIG. 3C, greedy growth algorithm module 260 rotates transformed spatial unit 350 clockwise 90 degrees (or counterclockwise 270 degrees) with respect to the origin of layout 330. Once rotated, the bottom left cell of transformed spatial unit 350 is at coordinate (0, −4), and the bottom left corner occupied cell of transformed spatial unit 350 is at coordinate (1, −4). Greedy growth algorithm module 260 translates transformed spatial unit 350 up 5 cells so that the bottom left corner occupied cell of transformed spatial unit 350 is at coordinate (1, 1).

Figure 3D:
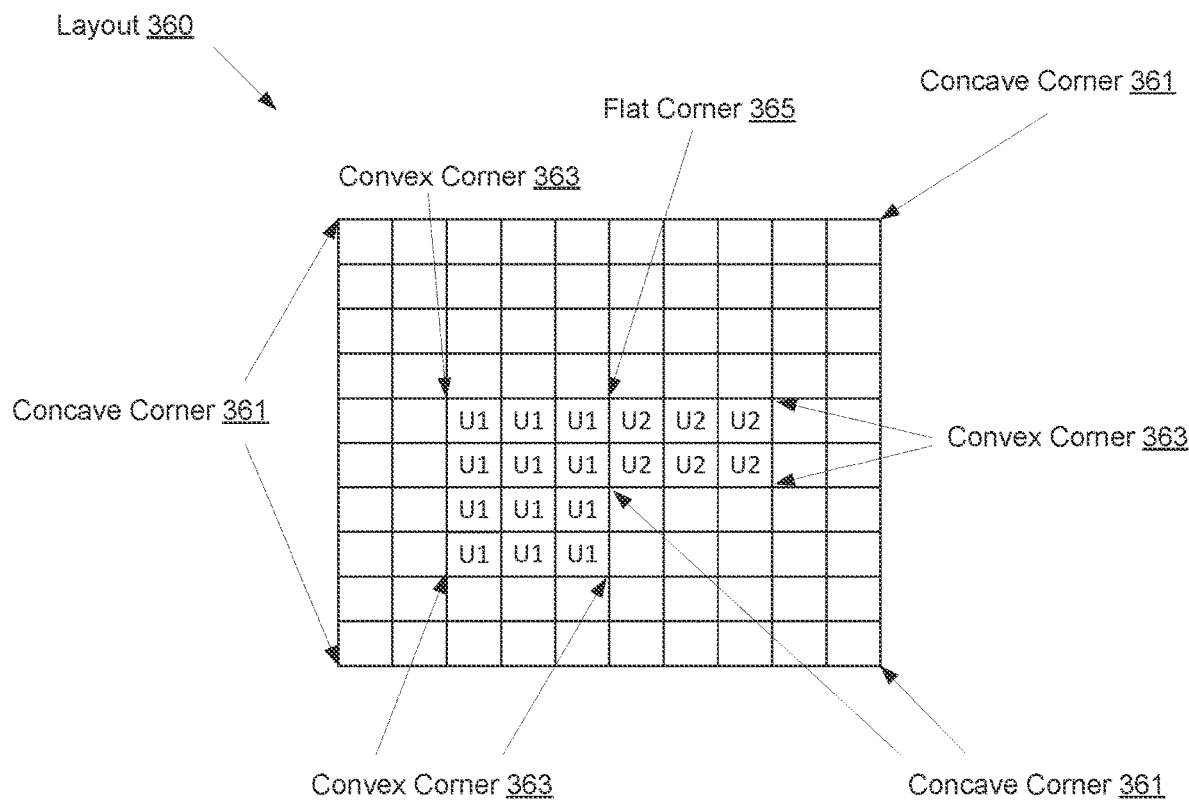
FIG. 3D illustrates a layout and two placed spatial units within the layout, according to one or more aspects of the various embodiments.

FIG. 3D shows a layout 360, consistent with layout 330 and layout 230, with two placed spatial units, and all existing corners of layout 360. The occupied cells of the first placed spatial unit U1 in layout 360 are identified as "U1." The occupied cells of the second placed spatial unit U2 in layout 360 are identified as "U2." The corners of layout 360 include concave corners 361, convex corners 363, one flat corner 365.

Figure 3E:
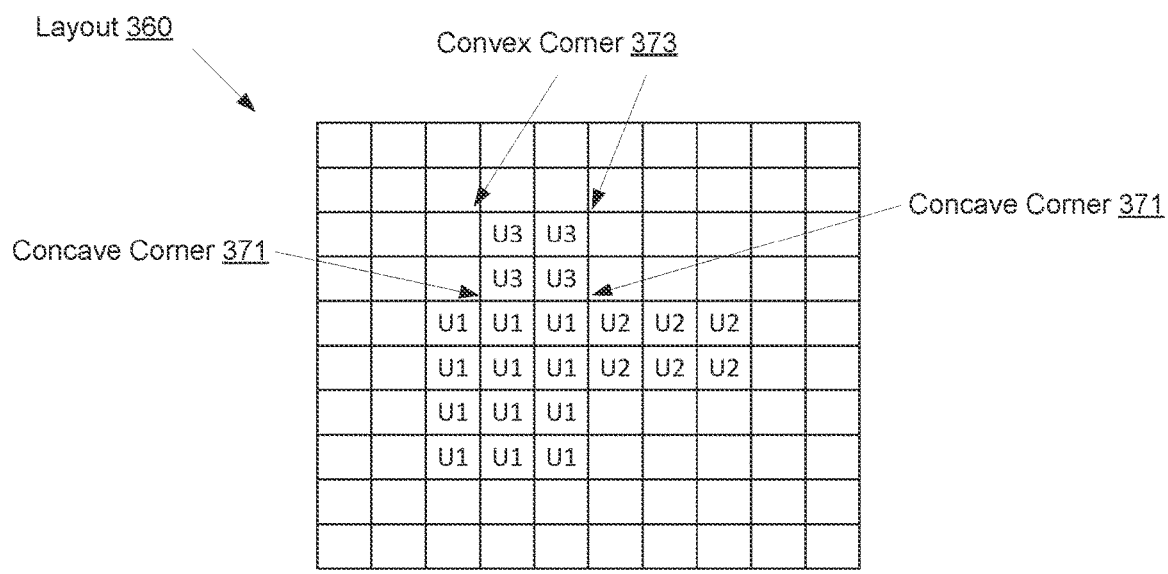
FIG. 3E illustrates an embodiment of the layout of FIG. 3D with three placed spatial units within the layout, according to one or more aspects of the various embodiments.

FIG. 3E shows layout 360 as in FIG. 3D with a third placed spatial unit U3. The occupied cells of the third placed spatial unit U3 are identified as "U3." As to the corners, FIG. 3E identifies new corners created by the placement of the third placed spatial unit U3. The new corners include concave corners 371 and convex corners 373. Greedy growth algorithm module 260 removes flat corner 365 from layout 360 in response to placing the third placed spatial unit U3 within layout 360.

Figure 4:
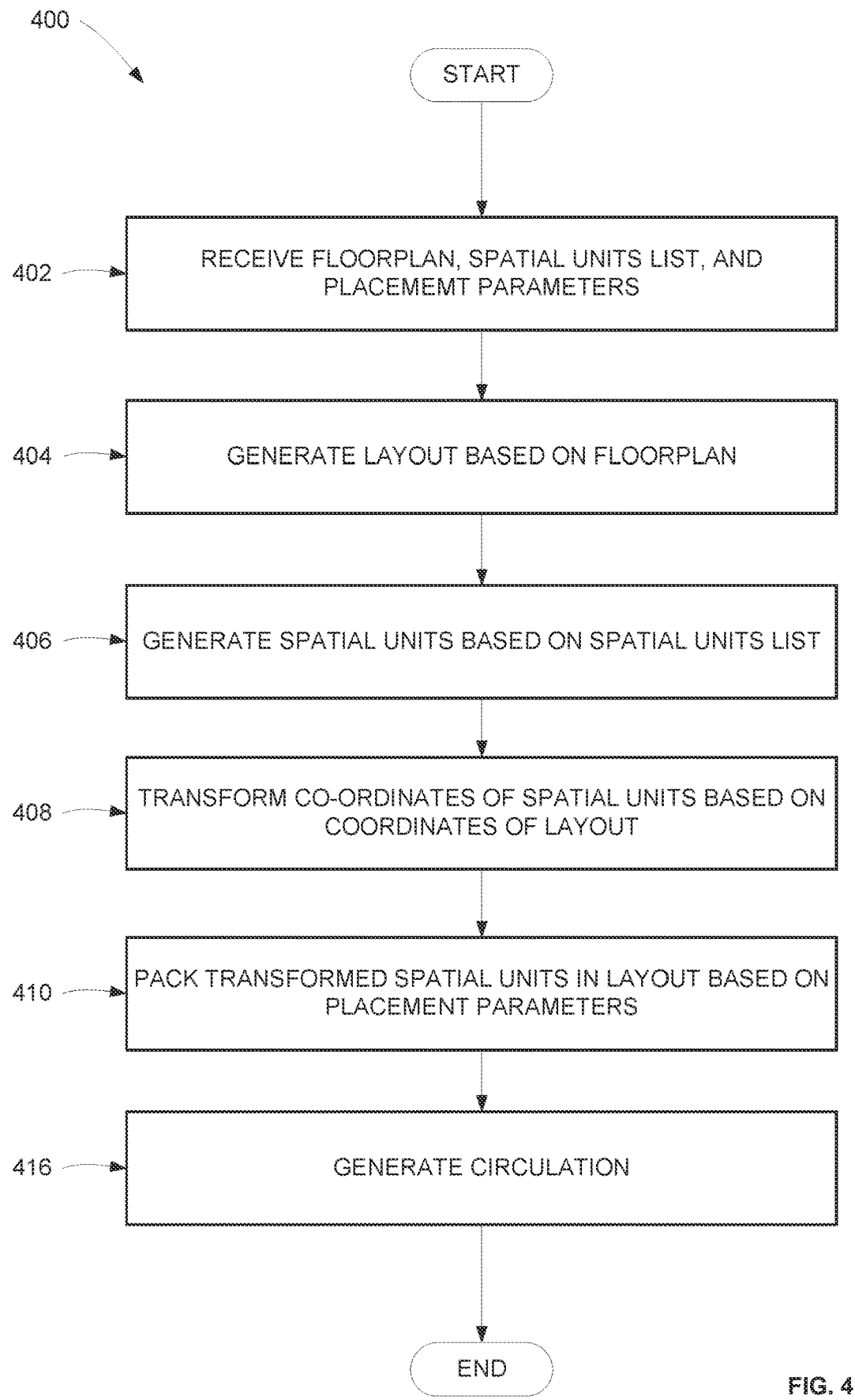
FIG. 4 illustrates a flow diagram of method steps for creating layouts of physical spaces, according to one or more aspects of the various embodiments.

FIG. 4 is a flow diagram of method steps of a method 400 for creating layouts of physical spaces, according to various embodiments of the present disclosure. Although the method steps are described in conjunction with the systems of FIGS. 1-3E, persons skilled in the art will understand that any system configured to implement the method steps, in any order, falls within the scope of the various embodiments.

Method 400 begins at step 402, where computing device 100 executes layout generation engine 118. At step 402, layout generation engine 118 receives floorplan 210, spatial units list 212, and placement parameters 214 from database 120.

At step 404, layout generation engine 118 generates layout 230 based on the floorplan received during step 402. To generate layout 230, layout generation engine 118 creates a grid of cells in a layout coordinate system, where the cells in the grid may be empty cells, void cells, and/or occupied cells.

At step 406, layout generation engine 118 generates one or more spatial units based on spatial units list 212 received at step 402. To generate the one or more spatial units, layout generation engine 118 creates a different grid of cells for each spatial unit in a corresponding spatial unit coordinate system. A grid of cells corresponding to a given spatial unit includes empty cells, void cells, and/or occupied cells into the spatial unit grid based on the spatial units list 212 and a spatial units level of granularity.

At step 408, layout generation engine 118 transforms the given spatial unit into a given transformed spatial unit 250 based on the spatial unit coordinate system and the layout coordinate system. Layout generation engine 118 may use a default initial position in the layout for each transformed spatial unit 250, such as positioning the bottom left cell of the given transformed spatial unit 250 at the origin coordinate (0, 0) of layout 230. In one example, layout generation engine 118 positions the given transformed spatial unit 250 at an initial position in layout 230 such that a corner occupied cell of the given transformed spatial unit 250 is at a coordinate of layout 230 that matches the coordinate of an identified empty cell corresponding to a corner of layout 230.

At step 410, layout generation engine 118 packs the transformed spatial units into layout 230 based on placement parameters 214. To pack a given transformed spatial unit 250, layout generation engine 118 performs corner matching, as discussed above. Layout generation engine 118 performs corner matching between the current transformed spatial unit 250 and one or more corners of the set of available corners of layout 230 to identify possible placements for the current transformed spatial unit 250. Layout generation engine 118 identifies a set of available corners in layout 230 as currently updated, as the available corners change with every placement, as discussed above. Layout generation engine 118 determines a placement location based on the scores resulting from corner matching. Layout generation engine 118 scores the possible placements based on placement parameters 214, and compares the scores to identify the best possible placement. Layout generation engine 118 places the given transformed spatial unit 250 at the determined placement location. Layout generation engine 118 generates packed layout 270 by placing transformed spatial units 250 in layout 230 and updating layout 230 and the corners of layout 230 after each placement, as discussed above. Layout generation engine 118 generates packed layout 270 based on the placement order parameters or the default placement order until there are no transformed spatial units 250 left to place or no other transformed spatial units 250 may be placed.

Steps 408 and 410 are performed for each spatial unit generated at step 406. In execution, layout generation engine 118, at step 406 may generate one spatial unit, a set of spatial units, or all the spatial units. From step 406 to step 408, layout generation engine 118 may transform one spatial unit, multiple spatial units, one or more sets of spatial units, or all the spatial units into transformed spatial unit(s) 250. At step 410, layout generation engine 118 packs one transformed spatial unit 250 at a time into layout 230.

At step 416, layout generation engine 118 generates a circulation for packed layout 270 based on placement parameters 214, as discussed above.

In sum, the disclosed techniques may be used to efficiently and accurately generate layouts for physical spaces. A layout generation module receives a physical space list as an input. The physical space list includes a set of spatial units, each having design parameters (e.g., floorplan parameters, spatial unit size, spatial unit shapes and dimensions, spatial unit type and/or purpose, spatial unit placement and/or adjacency requirements, placement order preference, adjacency requirements, proximity/distance requirements, separation requirements, and/or the like). To generate a given layout for a physical space, the layout generation module uses a packing algorithm to place the spatial units in a floorplan in a manner that conforms with the design parameters. In operation, the layout generation module generates a layouts by placing spatial units within a floorplan according in a sequence The default sequence involves placing spatial units from the interior to the exterior of the floorplan, following the order in the physical space list, while observing the design parameters.

A layout associated with a given physical space is defined as a grid of cells, a boundary corresponding to the floorplan of the physical space, and a coordinate system. Cells may be void, empty, or occupied. Void cells represent space that cannot be occupied by a spatial unit, for example, because of an internal boundary of the floorplan due to an obstruction. Empty cells are available for spatial unit placement, and occupied cells are otherwise empty cells that have been dedicated to a room and cannot be occupied by another room. Void cells and occupied cells form cell boundaries at their outermost edges. Contiguous clusters of occupied and/or void cells form cell boundaries at the perimeter of the cluster. In a given layout, a spatial unit is defined by a number of cells arranged in a manner representative of the shape and size of each room.

When placing a given spatial unit in the layout, the layout generation module applies a transform (translation and rotation) to the design parameters associated with the spatial unit such that the spatial unit is brought into the coordinate system of the layout. Through the transformed, the spatial unit is fitted into the layout, with the constraints of ensuring that no cell of the spatial unit overlaps with an occupied cell or a void cell and that no cell of the spatial unit is placed beyond the outside boundary of the layout. The layout generation module determines placement of the spatial unit by applying a greedy corner growth packing algorithm, through which one spatial unit is placed at a time by selecting a layout corner with a placement score that is highest among all currently available placements and fitting the spatial unit to the selected layout corner. The layout corners are defined by the perimeter of the inside boundary of the layout and by any clusters of contiguous void cells and/or occupied cells. The placement score is calculated based on the number of grids that a spatial unit would have to move to reach the origin, measured using Manhattan distance, with the score being modified according to any applicable parameters (e.g., location preference, spatial unit closeness preference, orientation, etc.).

At least one advantage and technological improvement of the disclosed techniques is that the layout generation module generates layouts in a manner that satisfies the design parameters at every sequence step of layout generation. Consequently, the layout generation module does not spend time, energy, and resources generating layouts that do not meet parametric requirements. Another advantage and technological improvement is the generation of layouts with increased space utility, reduced space fragments that are too small for use, and longer circulation paths formed by unit boundaries. These technical advantages provide one or more technological advancements over prior art approaches.

Any and all combinations of any of the claim elements recited in any of the claims and/or any elements described in this application, in any fashion, fall within the contemplated scope of the present invention and protection.

1. In various embodiments, a computer-implemented method for generating a layout for a physical space comprises generating a layout based on a floorplan of a physical space, generating a plurality of spatial unit grids corresponding to a plurality of spatial units to be placed in the physical space, identifying a placement for a first spatial unit grid in the plurality of spatial unit grids within the layout by matching a corner cell in the first spatial unit grid with a given available cell in the layout, generating a score associated with the placement for the first spatial unit grid based on one or more placement parameters that define placement constraints for a first spatial unit included in the plurality of spatial units and corresponding to the first spatial unit grid, and placing the first spatial unit grid in the layout based on the score.

2. The method of clause 1, where the layout comprises a first grid of cells associated with a first coordinate system and the first spatial unit grid is associated with a second coordinate system.

3. The method of clause 1 or 2, where identifying the placement for the first spatial unit comprises transforming the first spatial unit grid into the first coordinate system.

4. The method of any of clauses 1-3, further comprising identifying a second placement for the first spatial unit grid within the layout by matching a corner cell in the first spatial unit grid with a second available cell in the layout, and generating a second score associated with the second placement for the first spatial unit grid based on the one or more placement parameters, and where placing the first spatial unit grid in the layout is based on a comparison between the score and the second score.

5. The method of any of clauses 1-4, where matching the corner cell in the first spatial unit grid with the given available cell in the layout comprises moving the first spatial unit grid within the layout until the corner cell occupies an empty corner cell in the layout.

6. The method of any of clauses 1-5, where matching the corner cell in the first spatial unit grid with the given available cell in the layout further comprises determining whether the placement is valid based on a location of a boundary of the first spatial unit grid when the corner cell occupies the given available cell.

7. The method of any of clauses 1-6, where matching the corner cell in the first spatial unit grid with the given available cell in the layout further comprises determining whether the placement is valid based on whether another cell in the first spatial unit grid covers an occupied cell in the layout when the corner cell occupies the given available cell.

8. The method of any of clauses 1-7, where matching the corner cell in the first spatial unit grid with the given available cell in the layout further comprises determining whether the placement is valid based on whether another cell in the first spatial unit grid is outside the layout when the corner cell occupies the given available cell.

9. The method of any of clauses 1-8, further comprising identifying a second placement for a second spatial unit grid included in the plurality of spatial unit grids within the layout by matching a second corner cell in the second spatial unit grid with a second available cell in the layout, and generating a second score associated with the second placement for the second spatial unit grid based on a second set of placement parameters associated with the second spatial unit grid, and placing the second spatial unit grid in the layout is based on the second score.

10. In various embodiments, one or more non-transitory computer readable media store instructions that, when executed by one or more processors, cause the one or more processors to perform the steps of generating a layout based on a floorplan of a physical space, generating a plurality of spatial unit grids corresponding to a plurality of spatial units to be placed in the physical space, identifying a placement for a first spatial unit grid in the plurality of spatial unit grids within the layout by matching a corner cell in the first spatial unit grid with a given available cell in the layout, generating a score associated with the placement for the first spatial unit grid based on one or more placement parameters that define placement constraints for a first spatial unit included in the plurality of spatial units and corresponding to the first spatial unit grid, and placing the first spatial unit grid in the layout based on the score.

11. The one or more non-transitory computer readable media of clause 10, where the layout comprises a first grid of cells associated with a first coordinate system and the first spatial unit grid is associated with a second coordinate system.

12. The one or more non-transitory computer readable media of clause 10 or 11, where identifying the placement for the first spatial unit comprises transforming the first spatial unit grid into the first coordinate system.

13. The one or more non-transitory computer readable media of any of clauses 10-12, further comprising identifying a second placement for the first spatial unit grid within the layout by matching a corner cell in the first spatial unit grid with a second available cell in the layout, and generating a second score associated with the second placement for the first spatial unit grid based on the one or more placement parameters, and where placing the first spatial unit grid in the layout is based on a comparison between the score and the second score.

14. The one or more non-transitory computer readable media of any of clauses 10-13, where matching the corner cell in the first spatial unit grid with the given available cell in the layout comprises moving the first spatial unit grid within the layout until the corner cell occupies an empty corner cell in the layout.

15. The one or more non-transitory computer readable media of any of clauses 10-14, where matching the corner cell in the first spatial unit grid with the given available cell in the layout further comprises determining whether the placement is valid based on a location of a boundary of the first spatial unit grid when the corner cell occupies the given available cell.

16. The one or more non-transitory computer readable media of any of clauses 10-15, where matching the corner cell in the first spatial unit grid with the given available cell in the layout further comprises determining whether the placement is valid based on whether another cell in the first spatial unit grid covers an occupied cell in the layout when the corner cell occupies the given available cell.

17. The one or more non-transitory computer readable media of any of clauses 10-16, where matching the corner cell in the first spatial unit grid with the given available cell in the layout further comprises determining whether the placement is valid based on whether another cell in the first spatial unit grid is outside the layout when the corner cell occupies the given available cell.

18. The one or more non-transitory computer readable media of any of clauses 10-17, further comprising identifying a second placement for a second spatial unit grid included in the plurality of spatial unit grids within the layout by matching a second corner cell in the second spatial unit grid with a second available cell in the layout, and generating a second score associated with the second placement for the second spatial unit grid based on a second set of placement parameters associated with the second spatial unit grid, and placing the second spatial unit grid in the layout is based on the second score.

19. In various embodiments, a computer system comprises a memory storing instructions, and a processor that executes the instructions to generate a layout based on a floorplan of a physical space, generate a plurality of spatial unit grids corresponding to a plurality of spatial units to be placed in the physical space, identify a placement for a first spatial unit grid in the plurality of spatial unit grids within the layout by matching a corner cell in the first spatial unit grid with a given available cell in the layout, generate a score associated with the placement for the first spatial unit grid based on one or more placement parameters that define placement constraints for a first spatial unit included in the plurality of spatial units and corresponding to the first spatial unit grid, and place the first spatial unit grid in the layout based on the score.

20. The computer system of claim 19, wherein matching the corner cell in the first spatial unit grid with the given available cell in the layout comprises moving the first spatial unit grid within the layout until the corner cell occupies an empty corner cell in the layout.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a layout for a physical space, the method comprising:
    generating a layout based on a floorplan of a physical space, wherein the layout comprises a first grid of cells;
    generating a plurality of spatial unit grids representing a plurality of spatial units to be placed in the physical space, wherein each spatial unit grid in the plurality of spatial unit grids comprises one or more cells;
    identifying a placement for a first spatial unit grid in the plurality of spatial unit grids within the layout by matching a corner cell in the first spatial unit grid with a given available cell in the layout;
    generating a score associated with the placement for the first spatial unit grid based on one or more placement parameters that define placement constraints for a first spatial unit included in the plurality of spatial units and represented by the first spatial unit grid; and
    placing the first spatial unit grid in the layout based on the score.

2. The method of claim 1, wherein the layout comprises the first grid of cells associated with a first coordinate system and the first spatial unit grid is associated with a second coordinate system.

3. The method of claim 2, wherein identifying the placement for the first spatial unit comprises transforming the first spatial unit grid into the first coordinate system.

4. The method of claim 1, further comprising:
    identifying a second placement for the first spatial unit grid within the layout by matching a corner cell in the first spatial unit grid with a second available cell in the layout; and
    generating a second score associated with the second placement for the first spatial unit grid based on the one or more placement parameters,
    wherein placing the first spatial unit grid in the layout is based on a comparison between the score and the second score.

5. The method of claim 1, wherein matching the corner cell in the first spatial unit grid with the given available cell in the layout comprises moving the first spatial unit grid within the layout until the corner cell occupies an empty corner cell in the layout.

6. The method of claim 5, wherein matching the corner cell in the first spatial unit grid with the given available cell in the layout further comprises determining whether the placement is valid based on a location of a boundary of the first spatial unit grid when the corner cell occupies the given available cell.

7. The method of claim 5, wherein matching the corner cell in the first spatial unit grid with the given available cell in the layout further comprises determining whether the placement is valid based on whether another cell in the first spatial unit grid covers an occupied cell in the layout when the corner cell occupies the given available cell.

8. The method of claim 5, wherein matching the corner cell in the first spatial unit grid with the given available cell in the layout further comprises determining whether the placement is valid based on whether another cell in the first spatial unit grid is outside the layout when the corner cell occupies the given available cell.

9. The method of claim 1, further comprising:
    identifying a second placement for a second spatial unit grid included in the plurality of spatial unit grids within the layout by matching a second corner cell in the second spatial unit grid with a second available cell in the layout; and
    generating a second score associated with the second placement for the second spatial unit grid based on a second set of placement parameters associated with the second spatial unit grid, and
    placing the second spatial unit grid in the layout is based on the second score.

10. One or more non-transitory computer readable media storing instructions that, when executed by one or more processors, cause the one or more processors to perform the steps of:
    generating a layout based on a floorplan of a physical space, wherein the layout comprises a first grid of cells;
    generating a plurality of spatial unit grids representing a plurality of spatial units to be placed in the physical space, wherein each spatial unit grid in the plurality of spatial unit grids comprises one or more cells;
    identifying a placement for a first spatial unit grid in the plurality of spatial unit grids within the layout by matching a corner cell in the first spatial unit grid with a given available cell in the layout;
    generating a score associated with the placement for the first spatial unit grid based on one or more placement parameters that define placement constraints for a first spatial unit included in the plurality of spatial units and represented by the first spatial unit grid; and
    placing the first spatial unit grid in the layout based on the score.

11. The one or more non-transitory computer readable media of claim 10, wherein the layout comprises the first grid of cells associated with a first coordinate system and the first spatial unit grid is associated with a second coordinate system.

12. The one or more non-transitory computer readable media of claim 11, wherein identifying the placement for the first spatial unit comprises transforming the first spatial unit grid into the first coordinate system.

13. The one or more non-transitory computer readable media of claim 10, further comprising:
    identifying a second placement for the first spatial unit grid within the layout by matching a corner cell in the first spatial unit grid with a second available cell in the layout; and
    generating a second score associated with the second placement for the first spatial unit grid based on the one or more placement parameters, and
    wherein placing the first spatial unit grid in the layout is based on a comparison between the score and the second score.

14. The one or more non-transitory computer readable media of claim 10, wherein matching the corner cell in the first spatial unit grid with the given available cell in the layout comprises moving the first spatial unit grid within the layout until the corner cell occupies an empty corner cell in the layout.

15. The one or more non-transitory computer readable media of claim 14, wherein matching the corner cell in the first spatial unit grid with the given available cell in the layout further comprises determining whether the placement is valid based on a location of a boundary of the first spatial unit grid when the corner cell occupies the given available cell.

16. The one or more non-transitory computer readable media of claim 14, wherein matching the corner cell in the first spatial unit grid with the given available cell in the layout further comprises determining whether the placement is valid based on whether another cell in the first spatial unit grid covers an occupied cell in the layout when the corner cell occupies the given available cell.

17. The one or more non-transitory computer readable media of claim 14, wherein matching the corner cell in the first spatial unit grid with the given available cell in the layout further comprises determining whether the placement is valid based on whether another cell in the first spatial unit grid is outside the layout when the corner cell occupies the given available cell.

18. The one or more non-transitory computer readable media of claim 10, further comprising:
    identifying a second placement for a second spatial unit grid included in the plurality of spatial unit grids within the layout by matching a second corner cell in the second spatial unit grid with a second available cell in the layout; and
    generating a second score associated with the second placement for the second spatial unit grid based on a second set of placement parameters associated with the second spatial unit grid, and
    placing the second spatial unit grid in the layout is based on the second score.

19. A computer system, comprising:
    a memory storing instructions; and
    a processor that executes the instructions to:
        generate a layout based on a floorplan of a physical space, wherein the layout comprises a first grid of cells;
        generate a plurality of spatial unit grids representing a plurality of spatial units to be placed in the physical space, wherein each spatial unit grid in the plurality of spatial unit grids comprises one or more cells;
        identify a placement for a first spatial unit grid in the plurality of spatial unit grids within the layout by matching a corner cell in the first spatial unit grid with a given available cell in the layout;
        generate a score associated with the placement for the first spatial unit grid based on one or more placement parameters that define placement constraints for a first spatial unit included in the plurality of spatial units and represented by the first spatial unit grid; and
        place the first spatial unit grid in the layout based on the score.

20. The computer system of claim 19, wherein matching the corner cell in the first spatial unit grid with the given available cell in the layout comprises moving the first spatial unit grid within the layout until the corner cell occupies an empty corner cell in the layout.

* * * * *